United States Patent

Ishida et al.

[11] Patent Number: 5,705,865
[45] Date of Patent: Jan. 6, 1998

[54] ROTARY ELECTRIC MACHINE WITH INCREASED COOLING CAPACITY

[75] Inventors: Hiroshi Ishida, Anjo; Shin Kusase, Obu, both of Japan

[73] Assignee: Nippondenso Co., Ltd., Kariya, Japan

[21] Appl. No.: 635,004

[22] Filed: Apr. 19, 1996

Related U.S. Application Data

[63] Continuation of Ser. No. 280,880, Jul. 26, 1994, Pat. No. 5,561,334.

[30] Foreign Application Priority Data

Jul. 26, 1993  [JP]  Japan ................... 5-184106
Jun. 6, 1994   [JP]  Japan ................... 6-123827

[51] Int. Cl.$^6$ .................................................. H02K 9/00
[52] U.S. Cl. .................... 310/62; 310/43; 310/52; 310/58; 310/59; 310/61; 310/89; 310/263
[58] Field of Search ...................... 310/43, 52, 58, 310/59, 61, 62

[56] References Cited

U.S. PATENT DOCUMENTS

| | | | |
|---|---|---|---|
| 4,536,672 | 8/1985 | Kanayama et al. | 310/58 |
| 4,565,936 | 1/1986 | Ikegami et al. | 310/62 |
| 4,617,485 | 10/1986 | Nakamura et al. | 310/65 |
| 5,177,388 | 1/1993 | Hota et al. | 310/114 |
| 5,306,972 | 4/1994 | Hokanson et al. | 310/58 |
| 5,325,003 | 6/1994 | Saval et al. | 310/43 |

FOREIGN PATENT DOCUMENTS

| | | |
|---|---|---|
| 54-53608 | 4/1979 | Japan. |
| 56-086052 | 7/1981 | Japan. |
| 63-265545 | 11/1988 | Japan. |
| 4-36220 | 2/1992 | Japan. |

*Primary Examiner*—Clayton E. Laballe
*Assistant Examiner*—Elvin G. Enad
*Attorney, Agent, or Firm*—Cushman, Darby & Cushman IP Group of Pillsbury Madison & Sutro LLP

[57] ABSTRACT

A rotary electric machine that controls fluid pressure and loss of cooling air, increases the cooling air flow rate, and is able to favorably cool the end of a coil with little regard to the positional relationship between the centrifugal blades and the end of the stator coil, is disclosed. A cooling fan of such a rotary electric machine includes centrifugal blades having deflecting blades disposed therebetween, which are mounted so as to incline towards an inside of the axial direction. The centrifugal blades and the deflecting blades are integrally formed. For this reason, the cooling air accelerates at areas between the individual blades in the centrifugal direction and is separated into two flows, one in the direction of inside portions and one in the direction of outside portions of the end of a stator coil. The end of the stator coil is cooled favorably. Thus, the eddy produced at the inside portions in the end of the stator coil is suppressed from flowing to the outside portions, and increases in fluid pressure loss are prevented.

17 Claims, 4 Drawing Sheets

ROTARY ELECTRIC MACHINE WITH INCREASED COOLING CAPACITY

This is a continuation of application Ser. No. 08/280,880, filed Jul. 26, 1994 now U.S. Pat. No. 5,561,334.

BACKGROUND OF THE INVENTION

1. Field of the Invention:

The present invention relates to a cooling fan structure for rotary electric machines. More particularly, the present invention relates to a cooling fan structure suitable for use with devices such as alternators.

2. Related Art

Japanese Patent Application Laid-open publication No. 63-265545 discloses alternators having installed therein axial fans with a shroud at each edge. The shrouds are fastened at each end of the peripheral axial flow wings so as to favorably cool a rotor without directing cooling air in a centrifugal direction.

Today's alternators have centrifugal fans at the ends of the rotor core. The centrifugal fans consist of a plurality of centrifugal blades arranged in a radial configuration for cooling a coil-end of stator coils. Centrifugal cooling air that had begun to flow in centrifugal direction favorably cools the end of the stator coil, which has a poor cooling condition when at rest.

However, the prior art described above and presently known to the inventors Of the subject application has the drawback that the stator coil of the alternator is not sufficiently cooled.

Furthermore, some prior art devices have an increased chance of suffering from fluid pressure losses and sharp decreases in cooling air flow rates due to the eddy created by the curvature and swing motion of the cooling air in the vicinity of the inside portions at the end of stator coil. The positional relationship between the centrifugal blades and the end of the stator coil influences the cooling ability of the stator coil and therefore limits the magnetic circuit design. When the stator coil is not cooled properly, the magnetic resistance increases, and to achieve the same output power requires a larger magnetic circuit.

SUMMARY OF THE INVENTION

The present invention has been developed to alleviate the problems found in the prior art. An object of the present invention is to provide a rotary electric machine that increases the cooling air flow rates and thus controls the fluid pressure loss of the cooling air. Further, the present invention can favorably cool the stator coil with little regard to the positional relationship between the centrifugal blades and the stator coil end.

Based on the present invention, in a rotary electric machine including a cooling fan with a plurality of centrifugal blades for introducing cooling air in at least one end face of a rotor core, the cooling fan includes centrifugal blades and deflecting blades, which separate the cooling air into two directions, one heading towards inside portions and the other towards the outside portions.

Improved cooling can be achieved by bringing the end portions of the outer diameter of the deflecting blades close to the inside portion of the stator coil because the cooling air can be effectively separated into the two directions noted above.

When the centrifugal blades are connected at their base portions, which are fixed to the end face of the rotor core, it is simple to install the centrifugal blades on the rotor core and the blades are stably mounted.

In the case where a louvre is used as a cooling air passage between the inside portions of the end of the stator coil and a stator core, and also where a shoulder portion of the rotor core has a chamfering configuration, the cooling air in the vicinity of the inside portion of the end of the stator coil flows smoothly and thus further improves the cooling ability of the present invention.

In the case where the deflecting blades are formed integrally with the centrifugal blades using resins or the like, an angle of the deflecting blade can be accurately set, hence simplifying the production process.

When the case where the rotor core includes a plurality of claw-shaped magnetic poles, and where the cooling fan is mounted on a rear side of a rectifier disposed in an alternator, the end of the coil can be favorably cooled although poor flow of the cooling air occurs at the rear side of the alternator.

When the deflecting blades bend so as to be convex to one face portion of the rotor core, fluid loss is reduced, and air flows smoothly in the centrifugal direction.

When the cross-sectional configuration of the deflecting blades in combination with the axial direction has a wedge configuration, a good separation of cooling air using a simple blade configuration can be performed.

Furthermore, if the cooling fan has deflecting blades circumferentially connecting each of the centrifugal blades, the deflecting blades slope toward an axial direction, so that the cooling air is led to both the inside portion and outside portions of the end of the stator coil, fluid pressure loss of cooling air is controlled, and the cooling air flow rates increase. Thus, the stator coil can be favorably cooled.

According to the present invention, because a cooling fan includes deflecting blades, to which each of the centrifugal blades is connected, for separating cooling air into two directions around the end of a stator coil, a part of the cooling air accelerates at areas between the individual blades in the centrifugal direction and is deflected by forces acting in the direction towards the inside portion in the end of the coil. Hence, the cooling efficiency of the end of stator coil can be increased.

The deflecting blades also control the flow of the eddy, caused at the inside portion in the end of the coil, to the outside portion and handle the flow of cooling air that cools the outside portion in the end of the stator coil so that the cooling air flow rates can be increased.

Further objects, features, and advantages of the present invention, as well as economies of manufacture and methods of use and operation, will become apparent from a study of the detailed description, drawings, and appended claims, all of which form a past of this specification.

BRIEF DESCRIPTION OF THE DRAWINGS

The present invention will now be described with reference to the following figures, wherein like reference numerals designate corresponding elements. In the figures.

DETAILED DESCRIPTION OF THE PRESENTLY PREFERRED EXEMPLARY EMBODIMENTS

Figure 1:
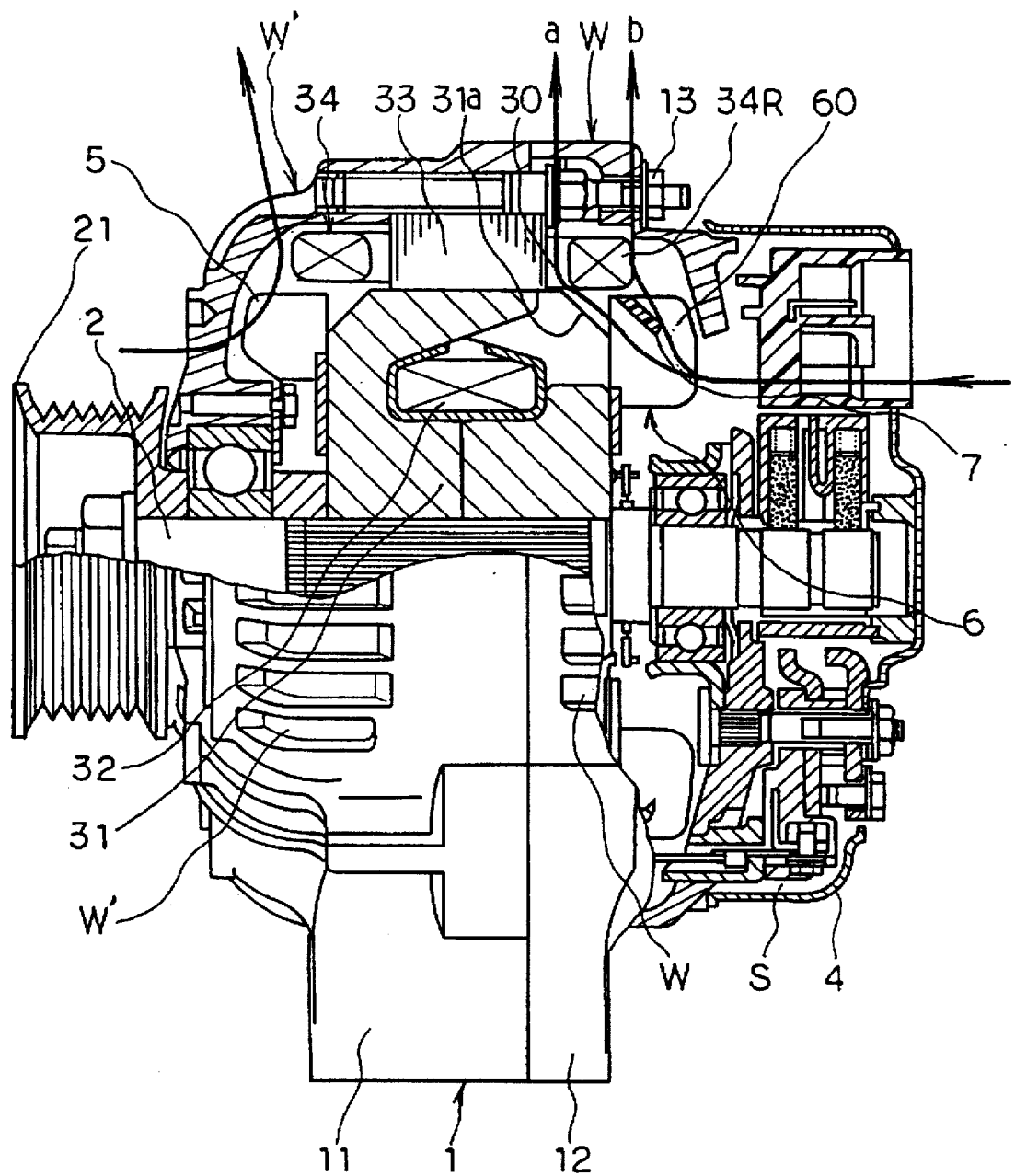
FIG. 1 is a cross-sectional view of an alternator according to the first embodiment of the present invention.

The first embodiment of rotary electric machine used as alternator for vehicles is pictured in FIG. 1.

Frame, which corresponds to a housing of the present invention, 1 comprises front frame 11 and rear frame 12. Frames 11 and 12 are fastened with a plurality of fastening bolts 13 and revolve around rotational axis 2, disposed next to rotor coil 31, which is wound with field coil 32. Field core 31 and field coil 32 make up a rotor. In the inside peripheral face of frame 1, armature core 33 is fixedly mounted surrounding field core 31, and wound with armature coil, i.e. stator coil, 34. Armature core 33 and armature coil 34 make up a stator.

Cover 4 stably covers the rear edge plane of rear frame 12. Between rear frame 12 and cover 4, electric component chamber S is formed, which contains, for example, a rectifier, a brush, and a regulator.

By belt-driving rotational axis 2 using a belt pulley 21 driven by means of an engine and magnetizing the device by energizing field coil 32, a three-phase voltage may be produced at armature coil 34 and is output after full-wave rectification at the rectifier.

Figure 2:
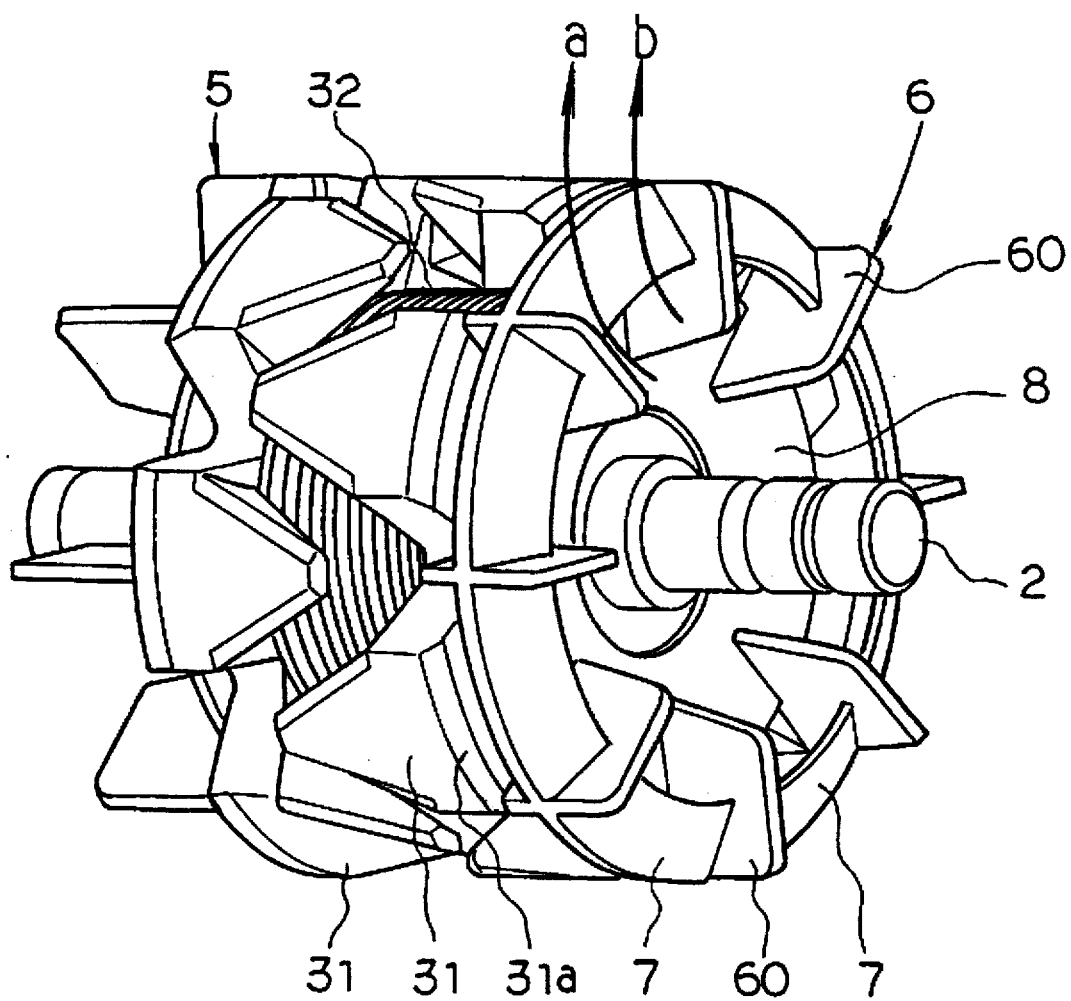
FIG. 2 is a perspective view of a rotor shown in FIG. 1.

Characteristic parts of the first embodiment are explained referring to the cross-sectional view shown in FIG. 1 and the perspective view of the stator shown in FIG. 2 as follows.

At rotational axis 2, centrifugal fan 5 and centrifugal fan 6 are disposed so as to have field core 31 therebetween. Centrifugal fan 6 includes eight pieces of centrifugal blades 60, integrally formed on base portions 8 and fixedly mounted at one face of field core 31.

A number of cooling windows W' are formed in a circumferential manner about the peripheral walls of front frame 11, and a number of cooling windows W are formed in a circumferential manner about the peripheral walls of rear frame 12 surrounding centrifugal fan 6.

The air produced by fan 5 is blown off from cooling windows W', and the air produced by fan 6 is blown off from cooling windows W in the centrifugal direction (as indicated with solid lines a and b in FIG. 1).

In the area between centrifugal blades 60, deflecting blades 7 are mounted and are inclined toward the rotational axis 2, and both ends of each deflecting blade 7 are integrally formed with each centrifugal blade 60 using resins. Each of the deflecting blades 7 is formed in a toroidal configuration, a truncated conical cylinder configuration, as a whole.

For this reason, a part of the cooling air produced by centrifugal blades 60 cools favorably the inside portions of the rear side end of the coil, as cooling air is a deflected toward the inside of the axial direction by each of the deflecting blades 7. At this point, cooling air a is discharged from cooling discharge window W in the centrifugal direction through shoulder chamfering 31a of rotor core 31 and through a ventilation trunk formed by louvre 30 disposed at a blade root at the end of rear side coil 34R. More particularly, a louver 30 acting as a passage for the cooling air is formed between an inside portion of the end of the coil 34R and the core 33. A part of the cooling air cools the outside portions of the end of rear side coil 34R as cooling air b and is discharged from cooling discharge window W.

By changing the setting position and angles of the deflecting blades, the end of rear side coil 34R is favorably cooled without any specific positional relationships between each centrifugal blade 60 and the end of rear side coil 34R.

Figure 3:
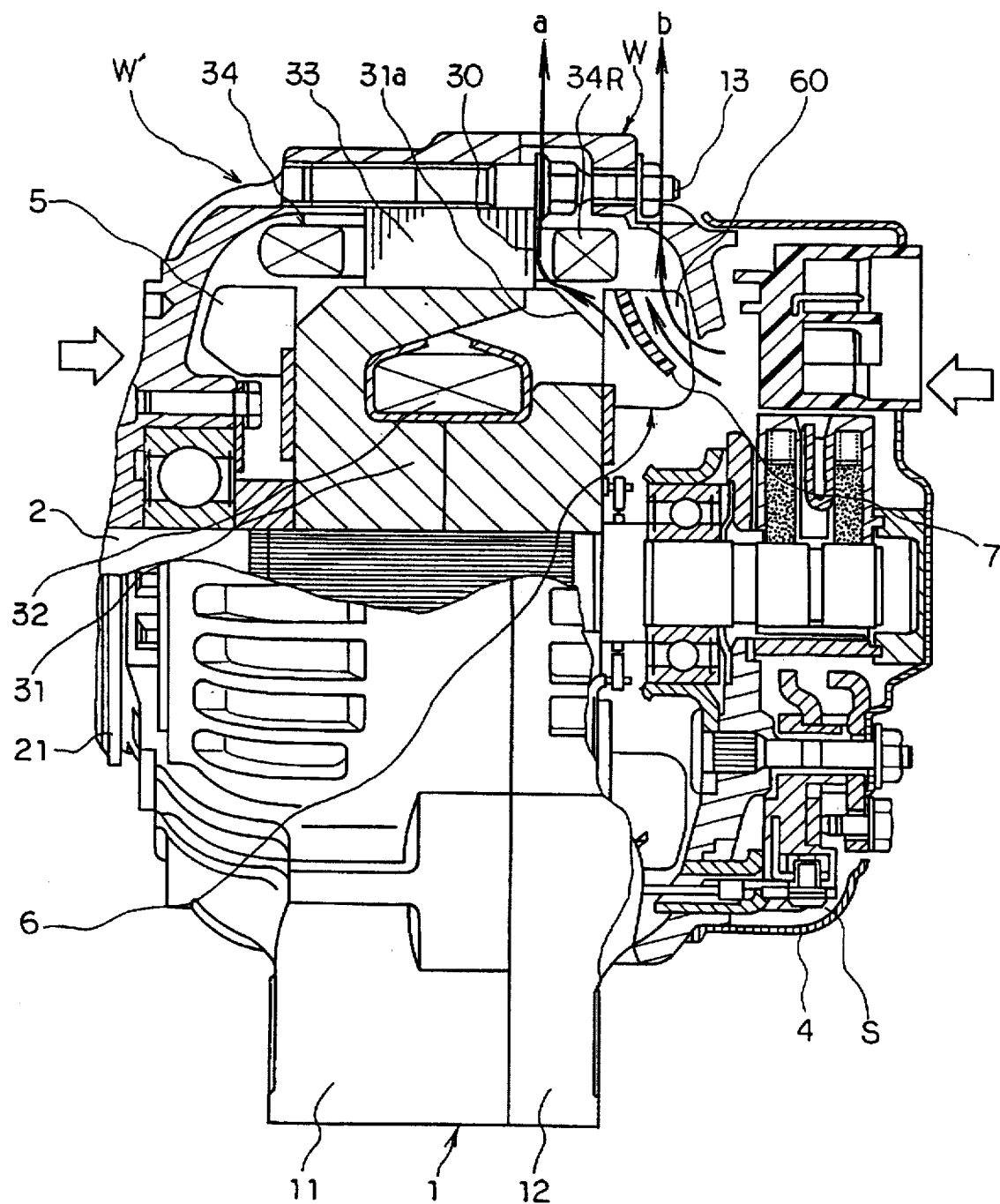
FIG. 3 is a cross-sectional view of an alternator depicting another embodiment of the present invention.

A second embodiment of the present invention is explained with reference to FIG. 3.

The second embodiment is the same as the first embodiment 1 except for the configuration and location of each deflecting blade 7.

Although each of the deflecting blades 7 is also mounted and inclined approximately, toward the inside portions in the end of rear side coil, the configuration of the blades is formed so as to make the blades convex in shape to the end face side of rotor core 31. This configuration further reduces fluid loss and air continues to flow smoothly in the centrifugal direction.

Figure 4:
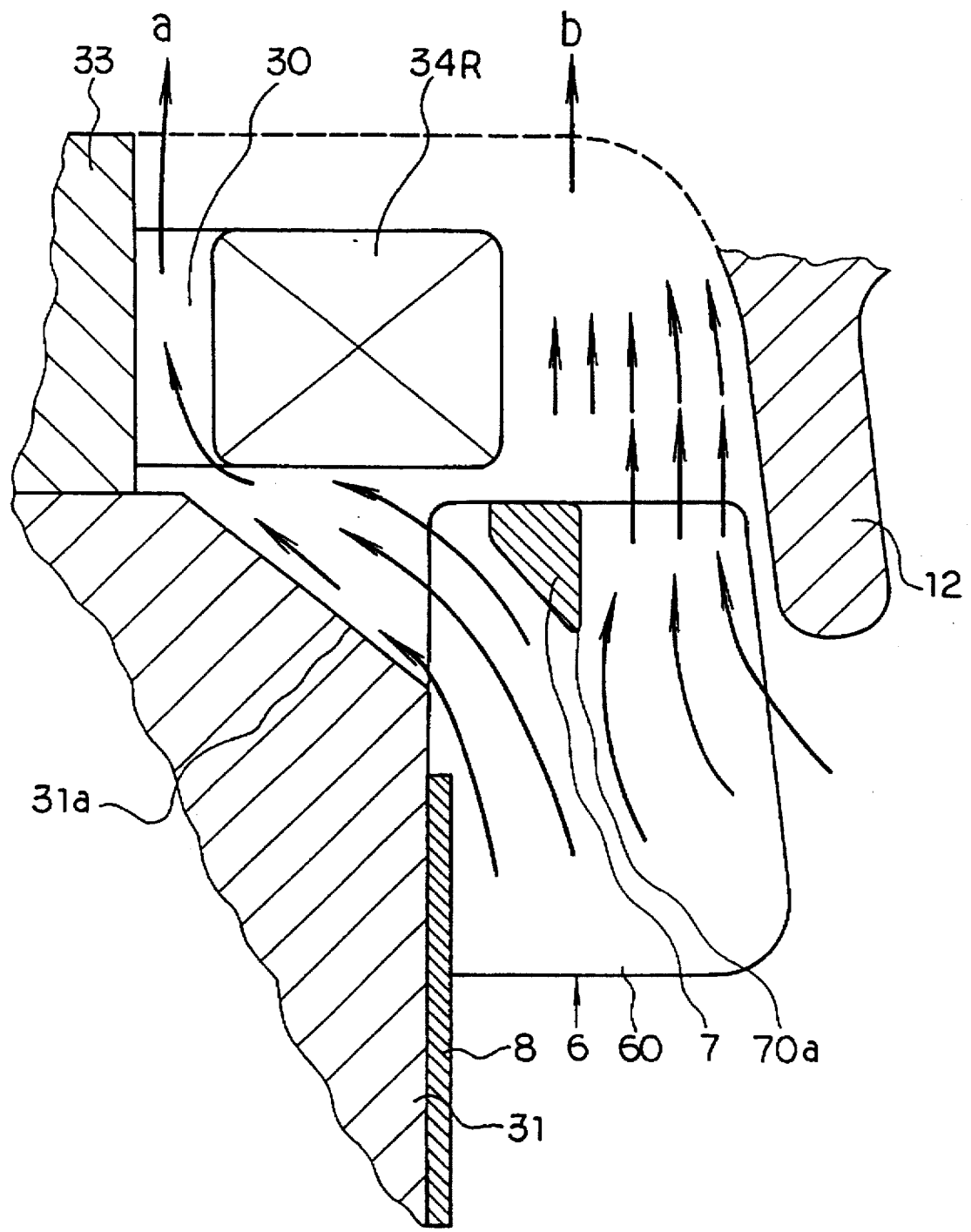
FIG. 4 is an enlarged perspective view of a portion of an alternator according to yet another embodiment of the present invention.

The third embodiment of the present invention is explained with reference to FIG. 4.

This embodiment is the same as the first embodiment except for the configuration and location of the deflecting blades 7.

In this embodiment, the cross-sectional configuration of each deflecting blade 7 is schematically shown as a wedge configuration, triangle configuration or trapezoid configuration. An apex of the deflecting blade 70a is mounted between the individual centrifugal blades 60 and extends in a direction opposite to the flow of cooling air. This configuration allows the separation of the cooling air into two flow streams while maintaining a low fluid pressure loss and using a simple blade configuration.

In each of the above-described embodiments, the rear side cooling fan is used, but the present invention is not intended to be limited to this form of cooling fan. Front side cooling fan can also obtain effects similar to those discussed above with respect to use of rear side cooling fans.

The present invention has been described with respect to the currently preferred embodiments, but the present invention is not to be limited to the disclosed embodiments. Rather, the invention is meant to encompass those modifications and changes that are within the spirit and scope of the appended claims.

What is claimed is:

1. A rotary electric machine comprising:
    a housing formed with cooling-air discharge windows for discharging a cooling-air in a centrifugal direction;
    a stator core formed cylindrically fixed to an interior face of said housing;
    a stator coil wound around said stator core and forming a passage between an axial inner face of a coil end portion thereof extending axially and an axial end face of said stator core to pass said cooling-air therethrough;
    a pair of bearings fixed to said housing;
    a rotary shaft rotatably supported by said bearings;
    a rotor core disposed radially inside said stator and fixed to said rotary shaft;
    a rotor coil wound around said rotor core;
    a cooling fan including a base fixed to an axial side end of said rotor core, a plurality of centrifugal blades for generating said cooling-air and a plurality of deflecting blades each connecting adjacent two of said centrifugal blades and having a radial outer end disposed in the vicinity of an axial outer end face of said coil end portion;
    said deflecting blades being arranged to separate said cooling-air into a first direction along which said cooling-air flows to said cooling-air discharge windows through said axial outer end face of said coil end and into a second direction along which said cooling-air flows to said cooling-air discharge windows through a radial inner face of said coil end through and said passage; and said deflecting blades being made of resin integrally with said base and said centrifugal blades and being disposed radially outside said base.

2. A rotary electric machine according to claim 1, further comprising:

an electric component chamber including a rectifier therein and disposed adjacent to said cooling fan.

3. A rotary electric machine according to claim 1, wherein:

said deflecting blades are each formed into a convex shape toward said axial side end of said rotor core.

4. A rotary electric machine according to claim 1, wherein:

said deflecting blades are each formed into a wedge-like shape and has an apex portion at a radial inner end thereof.

5. A rotary electric machine comprising:

a housing formed with cooling-air discharge windows on a circumference thereof;

a rotor rotatably supported within said housing; and a cooling fan fixed to an axial side end of said rotor to take in air axially from outside and discharge said air outside through said cooling-air discharge windows;

wherein said cooling fan includes:

a base fixed to said axial side end of said rotor;

a plurality of flow generating blades connected with said base and extending axially from said base, said flow generating blades each having a radially outer portion extending radially outwardly from said base; and a deflecting blade disposed between said radially outer portions of two of said flow generating blades and connecting the same circumferentially at only a radially outward position from said base to deflect a flow direction of said air, and wherein said base, said flow generating blades and said deflecting blade are formed integrally from a same material.

6. A rotary electric machine according to claim 5, wherein:

said flow generating blades include centrifugal blades each formed at substantially right angle to said base.

7. A rotary electric machine according to claim 6, wherein:

said flow generating blades each has a radially inner portion extending radially inwardly from said radially outer portion at a position radially inside a radially innermost end of said deflecting blade so that said air is generated by said radially inner portion, separated by said deflecting blade and strengthened by said radially outer portion.

8. A rotary electric machine according to claim 7, wherein:

said radially inner portion has an axial length longer than that of said radially outer portion.

9. A rotary electric machine according to claim 5, wherein:

said deflecting blade has an apex at a radially innermost portion thereof.

10. A rotary electric machine according to claim 5, wherein:

said deflecting blade has a radially outermost portion positioned at the same radial height as that of a radially outermost portion of said flow generating blades.

11. A rotary electric machine according to claim 5, wherein:

said base, said flow generating blades and said deflecting blade are made of resin.

12. A rotary electric machine according to claim 5, wherein:

said deflecting blade is formed between all adjacent two of said flow generating blades.

13. A rotary electric machine according to claim 5, wherein:

said flow generating blades each has a radially outermost portion positioned at the same radial height as that of a radially outermost portion of said rotor; and said rotor has a flow guide portion for guiding said air from said axial side end thereof to said radially outermost portion thereof.

14. A rotary electric machine according to claim 13, wherein:

said flow guide portion is formed by chamfering a shoulder portion of said rotor.

15. A rotary electric machine according to claim 14, further comprising:

a stator fixed to a radial inside of said housing and facing a radially outermost face of said rotor, wherein said cooling-air discharge windows are disposed to allow discharge of said air flowing radially through both axial outside and inside of said stator.

16. A rotary electric machine according to claim 15, wherein:

said flow generating blades include centrifugal blades each formed at substantially right angle to said base.

17. A rotary electric machine according to claim 5, further comprising a stator core fixed to an interior face of said housing; and a stator coil wound around said stator core, a passage being defined between an axial inner face of a coil end portion of said stator core and an axial end face of said stator core, said deflecting blades directing at least a portion of said air through said passage.

* * * * *